United States Patent [19]
Patrigeon et al.

[11] Patent Number: 5,154,948
[45] Date of Patent: Oct. 13, 1992

[54] METHOD FOR SHAPING A FIBROUS REINFORCEMENT TEXTURE USED IN THE MANUFACTURE OF A COMPOSITE MATERIAL PART

[75] Inventors: Yves D. Patrigeon, Bordeaux Cauderan; Michel C. Vives, Eysines, both of France

[73] Assignee: Societe Europeenne De Propulsion, Suresnes, France

[21] Appl. No.: 674,502

[22] Filed: Mar. 22, 1991

[30] Foreign Application Priority Data

Mar. 26, 1990 [FR] France ................. 90 03837

[51] Int. Cl.$^5$ ............................. C04B 35/52
[52] U.S. Cl. ........................ 427/249; 156/89; 156/289; 156/323; 264/82; 264/136; 264/257; 427/255
[58] Field of Search ............ 264/29.1, 29.5, 81, 264/82, 136, 257, 258; 427/248.1, 249, 255, 255.2, 255.3; 156/87, 89, 242, 288, 289, 323

[56] References Cited

U.S. PATENT DOCUMENTS

| | | | |
|---|---|---|---|
| 3,895,084 | 7/1975 | Bauer | 264/29.1 |
| 3,917,782 | 11/1975 | Holcombe et al. | 264/81 |
| 4,178,413 | 11/1979 | De Munda | 427/249 |
| 4,257,835 | 3/1981 | Bompard | 264/29.5 |
| 4,318,948 | 3/1982 | Hodgson | 428/68 |
| 4,353,964 | 10/1982 | Grimm et al. | 264/81 |
| 4,460,529 | 7/1984 | Schultze et al. | 264/81 |
| 4,613,522 | 9/1986 | Vasilos | 427/249 |
| 4,628,846 | 12/1986 | Vives | 112/262.1 |
| 4,741,873 | 5/1988 | Fischer et al. | 264/258 |
| 4,752,503 | 6/1988 | Thebault | 427/249 |
| 4,790,052 | 12/1988 | Olry | 28/110 |
| 4,861,575 | 8/1989 | Levan | 264/29.5 |
| 4,894,286 | 1/1990 | Gray | 427/402 |
| 4,963,393 | 10/1990 | Goela et al. | 427/248.1 |
| 4,997,678 | 3/1991 | Taylor et al. | 427/249 |
| 5,034,172 | 7/1991 | Vives et al. | 427/249 |

FOREIGN PATENT DOCUMENTS

| | | |
|---|---|---|
| 0349245 | 1/1990 | European Pat. Off. |
| 2722575 | 12/1977 | Fed. Rep. of Germany |
| 2401888 | 3/1979 | France |
| 2565262 | 9/1988 | France |
| 436092 | 11/1967 | Switzerland |

Primary Examiner—Jay H. Woo
Assistant Examiner—Robert B. Davis
Attorney, Agent, or Firm—Weingarten, Schurgin, Gagnebin & Hayes

[57] ABSTRACT

The shaping of the fibrous texture is at least partly achieved by applying a deformable layer or strip, such as a cloth, made from a material having a thermal expansion coefficient different from that of the material constituting the fibrous texture. The layer or strip is stretched over the fibrous texture or is held in position against the texture by being wound over in order to obtain the degree of compaction wanted for the fibrous texture. The texture is densified by chemical vapor infiltration of the material constituting the matrix of the composite.

11 Claims, 3 Drawing Sheets

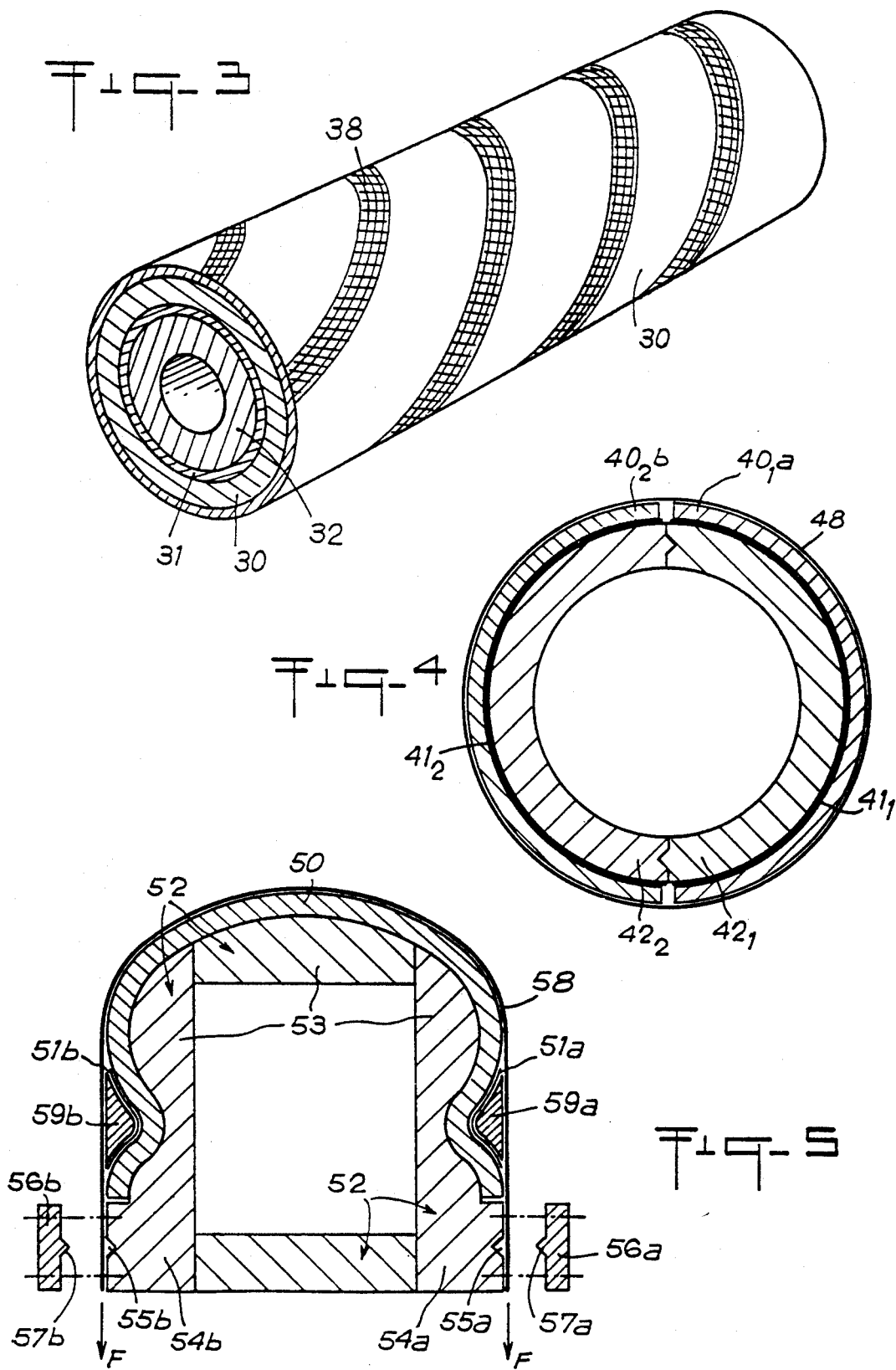

METHOD FOR SHAPING A FIBROUS REINFORCEMENT TEXTURE USED IN THE MANUFACTURE OF A COMPOSITE MATERIAL PART

FIELD OF THE INVENTION

The present invention relates to the manufacture of composite material parts comprising a fibrous reinforcement texture densified by a matrix.

The invention relates more particularly to a method of the type consisting in first shaping the fibrous reinforcement texture and then densifying the texture by chemical vapor infiltration.

BACKGROUND OF THE INVENTION

Such a method is used particularly for manufacturing parts in thermostructural composite materials, e.g. materials capable of constituting structural elements and of retaining their mechanical properties at high temperatures.

Examples of thermostructural composite materials are the carbon-carbon (C—C) type composites and the ceramic matrix type composites (CMC).

In a C—C type composite, the reinforcement texture is in carbon fibers and is densified by carbon, while in a CMC-type composite, the reinforcement texture is in refractory fibers (carbon or ceramic fibers) and is densified by a ceramic matrix.

When the thermostructural composite material parts are produced by chemical vapor infiltration of the material constituting the matrix, through the accessible porosity of the reinforcement texture, the shape of said texture is generally maintained by means of a tool, normally in graphite. This tool makes it possible to confer to the fibrous reinforcement texture a shape approaching that of the part to be produced, and to compact said texture in order to obtain the required fiber density.

The fibrous texture held in the tool, is placed inside an oven in order to undergo a chemical vapor infiltration at temperatures which are kept relatively high.

The beginning of densification consolidates the texture by bonding the fibers together. The texture then has sufficient cohesion to retain its shape and to be handled, after being released from the tool, in order to continue the infiltration without the tool.

Initially, the material constituting the matrix tends to deposit on the surface rather than to penetrate to the core of the texture, resulting in a partial obturation of the surface porosity in those areas of the texture exposed to the gas flowing through the apertures of the tool. The result is that, after consolidation, a machining operation is often required in order to scale the texture, e.g. in order to remove the surface parts where the constituent material of the matrix has accumulated in too great quantity, and in order to make the porosity to the core accessible again.

Use of the tool involves disadvantages.

A tool in graphite is expensive to produce, particularly because of the machining that it requires, on the one hand to obtain the required shape, and on the other hand, to provide apertures giving to the gases used for infiltrating the matrix access to the texture to be densified.

Also, due to their bulkiness and their weight, the tools occupy a rather important part of the serviceable volume of the oven and they present high thermal inertia.

Moreover, the tool partly conceals the surface of the fibrous texture, which causes a densification which is not exactly uniform and a surface condition which is non-homogeneous and uneven.

SUMMARY OF THE INVENTION

It is therefore the object of the invention to provide a method whereby the aforesaid disadvantages which are linked to the use of a tool, are substantially reduced.

This object is reached in that, according to the invention, the shaping of the fibrous texture is at least partly achieved by applying a deformable layer or strip in a two-dimensional fibrous material.

The layer or strip can be stretched over the fibrous texture, the tension being adjusted as a function of the degree of compaction wanted for the texture.

The material constituting the layer or strip may be a cloth, formed of refractory fibers for example.

The shaping layer or strip can be held over the texture by means being wound over it. As a variant, it can be held by connecting the layer or strip to a rigid tool ensuring part of the shaping of the texture, or by winding the strip around the texture.

The use of a layer or strip makes it possible to reduce the tools, hence to reduce the costs, bulk and weight. Moreover, the use of a layer or strip of cloth makes a ready access for the for the gas flow used for the infiltration of the texture, hence an improvement of the capacity of densification and a more homogeneous densification.

Advantageously, the shaping layer or strip is made from a material having a coefficient of expansion different from that of the constituent material of the fibrous texture.

The densification by chemical vapor infiltration being carried out at a relatively high temperature, the difference of expansion between the shaping layer or strip and the fibrous texture causes, during the cooling phase following the infiltration, splitting on the level of the interface between the texture and the shaping strip or layer co-infiltrated by the matrix. Therefore, at the end of the texture consolidation phase, the shaping layer or strip is easily detached from the texture. The removal of the shaping layer or strip eliminates the surface deposition mainly occurring thereon. In consequence, the porosity to the core is readily accessible for continuing the densification without having to carry out a scaling. Moreover the condition of the obtained surface is homogeneous and regular.

BRIEF DESCRIPTION OF THE DRAWINGS

The invention will be more readily understood on reading the following description given with reference to the accompanying drawings, in which:

FIG. 3 is a diagrammatical perspective view illustrating another embodiment of the method according to the invention, for producing a cylinder-shaped composite material part;

FIG. 4 is a diagrammatical cross-section illustrating another embodiment of the method according to the invention for producing two composite material parts shaped as cylinder portions;

FIG. 5 is a diagrammatical cross-section in perspective showing another embodiment of the method according to the invention for producing a composite material part of complex shape with at least one concave part.

DETAILED DESCRIPTION OF PREFERRED EMBODIMENTS

The following description is made with reference to the manufacture of C—C or CMC composite material parts, which is a preferred field of application of the invention.

Figure 1:
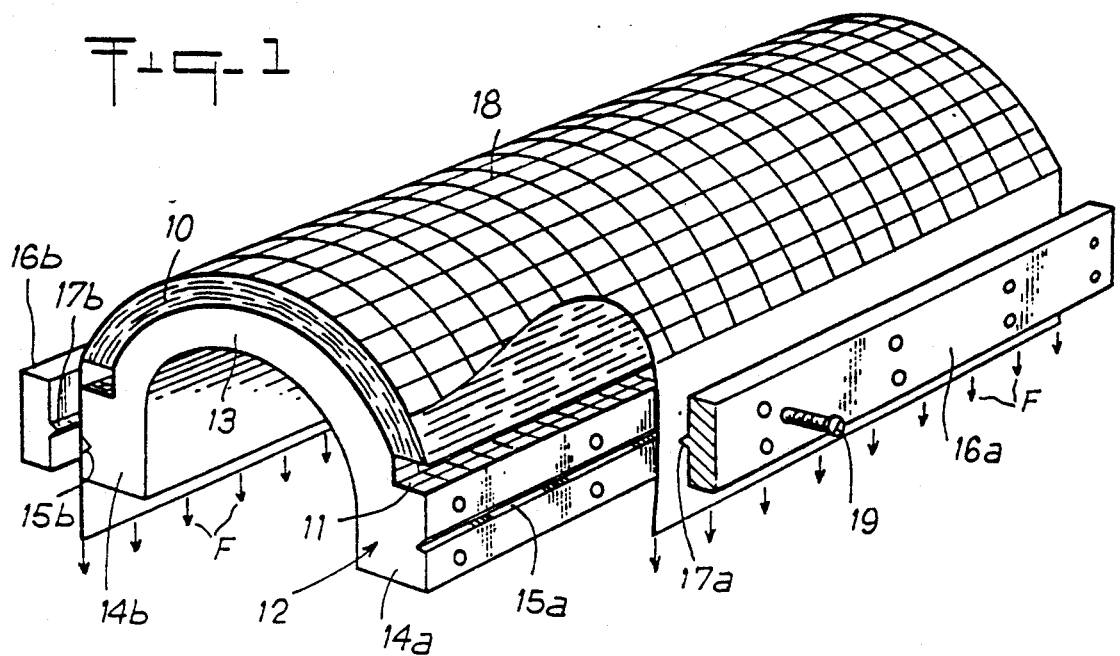
FIG. 1 is a diagrammatical perspective view illustrating one embodiment of the method according to the invention for producing a composite material part having the shape of a portion of cylinder.

FIG. 1 illustrates the shaping of a fibrous texture 10 intended for manufacturing a composite material part in the form of a cylinder portion, in this case a cylinder portion spreading over an arc of less than 180°.

The texture 10 is in refractory fibers selected for example from carbon fibers and ceramic fibers (silicon carbide, boron nitride, alumina, zirconia, . . . ).

The texture 10 may be constituted by a stack of two-dimensional layers or strips, such as of cloth, and is shaped inside a rigid tool element, or shaping member 12 and by a shaping layer 18 stretched over the texture 10 and secured in position on the shaping member 12.

The stacked layers forming the texture 10 may be bonded together by means of fibers forming a non-zero angle with respect to the faces of the texture. Bonding may be achieved beforehand on the flatly stacked layers, by implanting yarns perpendicularly to the stacked layers or by needling. A yarn-implanting method is described in U.S. Pat. No. 4,628,846 while methods for producing needled flat fibrous structures are described in U.S. Pat. No. 4,790,052 and in U.S. patent application Ser. No. 416,658 of Oct. 3, 1989.

The shaping member 12 comprises a center part 13 shaped as a portion of cylinder corresponding to the shape to be given to the texture 10. The layers constituting this texture are stacked on the upper surface of the center part 13. Along the parallel longitudinal edges said center part, the shaping member 12 comprises flanges 14a, 14b.

The shaping layer 18 is composed of a layer of cloth such as a satin or a woven stretched over the texture 10. The tension exerted on the layer 18 is adjusted as a function of the degree of compaction to be applied to the texture 10 in order to obtain the target density rate of fibers (e.g. the proportion of the apparent volume of texture effectively occupied by the fibers). The tension exerted on layer 18 is evenly distributed along its longitudinal edges (as shown by arrows F in FIG. 1).

The layer 18, while being held under the wanted tension, is locked in position on the shaping member 12. To this effect, the edges of the layer 18 are gripped between the flanges 14a, 14b of the shaping member 12 and bars 16a, 16b screwed on said flanges by means of screws 19. As can be seen in FIG. 1, the flanges 14a, 14b present longitudinal grooves 15a, 15b of V-shaped cross-section which grooves cooperate with corresponding ribs 17a, 17b formed on the bars 16a, 16b in order to wedge the layer in position at the bottom of the grooves 15a, 15b. It is understood that any other system for locking the layer 18 in position on the shaping member 12 could also be used.

The shaping member 12 is for example produced in graphite with multiple apertures (not shown) provided through its center part 13 in order to allow the passage of a gas flow during the chemical vapor infiltration operation. The bars 16a, 16b and screws 19 are also made of graphite.

The layer 18 is made from a material having a thermal expansion coefficient different from that of the constituent material of the texture 10. Accordingly, when the texture 10 is in carbon, the shaping layer 18 may be constituted either by a cloth of refractory fibers other than carbon fibers, for example a cloth in silicon carbide, or by a cloth in carbon fibers modified by depositing on the fibers a refractory material other than carbon, for example a ceramic material such as silicon carbide. On the contrary, when the texture to be densified is in ceramic or any other refractory material but carbon, then a shaping layer in a cloth of carbon fibers can be used.

The texture 10, which is compressed between the shaping member 12 and the layer 18, is subjected to a densification by chemical vapor infiltration of the material constituting the matrix. Chemical vapor infiltration methods are particularly described in U.S. Pat. No. 3,895,084 for the manufacture of C—C composite parts, and in French Patent No. 2,401,888 for the manufacture of CMC parts.

The chemical vapor infiltration being carried out at relatively high temperatures, the expansion differences between the texture 10 and the layer 18 cause, during the cooling phase which follows the densification, splitting at the level of the interface between the texture and the shaping layer which are co-infiltrated.

After consolidation, the partly densified texture 10 may be released from its holding tool for continuing the densification. A scaling of the consolidated texture is not necessary at least on the surface thereof which was in contact with the shaping layer. What is more, the surface has a homogeneous and regular condition.

When positioning the texture 10 on the shaping member 12, a layer 11 will advantageously be interposed between the center part 13 of the shaping member and the fibrous texture 10, in accordance with the method described in U.S. patent application Ser. No. 620,157 filed on Nov. 29, 1990. The inserted layer 11 is for example formed by a layer of cloth and is made from a material having a thermal expansion coefficient different from that of the constituent material of the texture 10. The layers 11 and 18 may be made from the same cloth.

As with the shaping layer 18, the differential expansion effect between the texture 10 and inserted layer 11 causes, during the cooling phase following the infiltration, natural splits in the matrix at the level of the interface between the texture 10 and the inserted layer 11. As a result, and also due to the fact that the inserted layer 11 reduces contact between the fibers of the texture 10 and the surface of the shaping member 12, the texture 10 can be easily released from the shaping member 12. In addition, the loss of cohesion between the texture 10 and the inserted layer 11 eliminates the necessity, after consolidation of the texture, of possible scaling of the surface of the texture 10 turned toward the shaping member 12.

Other embodiments of the method according to the invention, using a shaping layer or strip, will not be described more succintly, with reference to FIGS. 2 to 7. In all these embodiments, any shaping and compacting of the fibrous texture are produced by means of a shaping layer or strip in the form of a two-dimensional texture, such as a cloth, made from a material whose thermal expansion coefficient is different from that of the constituent material of the fibrous texture. The same applies to the material constituting any inserted layers which may be used.

Figure 2:
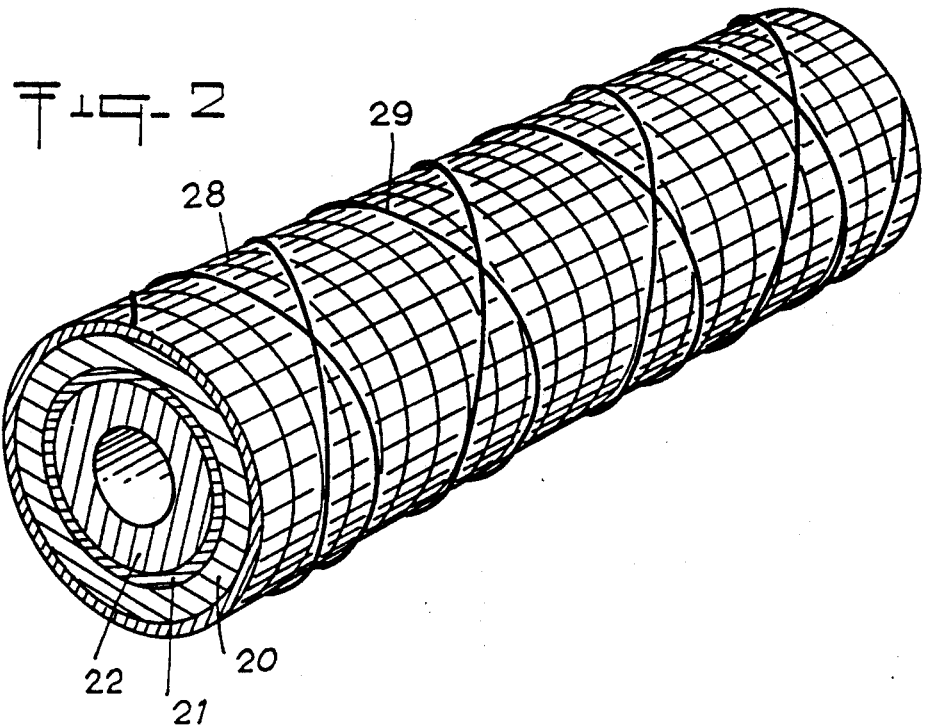
FIG. 2 is a diagrammatical perspective view illustrating another embodiment of the method according to the invention for producing a cylinder-shaped composite material part.

FIG. 2 shows a cylindrical fibrous texture 20 which is held between a hollow rigid cylindrical shaping member 22 and a shaping layer 28.

The texture 20 is formed for example by winding a strip of cloth on the shaping member 22 which is equipped with an inserted layer 21.

The shaping layer 28 is a strip of cloth wound over the texture 20 so as to form a single layer, and is held thereon by winding a yarn 29 over it. Said yarn is in a refractory material (carbon or ceramic) which is not necessarily the same as that composing the shaping layer 28.

The strip of cloth composing the texture 20 can be wound under stretch, in order to achieve the compaction wanted for the texture; said texture being maintained in compacted condition by the shaping layer 28 and the yarn 29. The yarn 29 is wound helically with a large pitch so as to obtain a slight winding of the yarn, just tight enough to hold the texture 10 and the shaping layer 28 in position.

FIG. 3 also shows a cylindrical fibrous texture 30 formed by winding a strip of cloth over a hollow cylindrical rigid shaping member 32 comprising an inserted layer 31.

The texture 30 is held in position by a shaping strip 38. Said strip is constituted by a strip of cloth, or a tape, of width smaller than the width of the texture 30.

The shaping strip is wound over the texture 30 in such a way as to form helical turns. Winding of the strip 38 may be relatively slight (non-contiguous turns) and yet maintain efficiently the texture 3 in position.

FIG. 4 shows two fibrous textures $40_1$, $40_2$ forming cylinder portions gripped between a hollow cylindrical rigid shaping member and a shaping layer 48. The textures $40_1$, $40_2$ each extend over an arc less than or equal to 180°. The shaping member is composed of two identical semi-cylindrical half-shells joined together to form a cylinder. Each half-shell $42_1$, $42_2$ carries a respective fibrous texture $40_1$, $40_2$ from which it is separated by an inserted layer $41_1$, $41_2$.

In the example illustrated in FIG. 5, the fibrous texture 50 has the form of a section piece of substantially Ω-shaped cross-section and is held in position between a rigid shaping member 52 and a shaping layer 58.

The rigid shaping member 52 is made up of a plurality of parts assembled together so that it has, in its center part 53, an Ω-profile corresponding to that given to the fibrous texture 50.

Layer 58 is a layer of cloth stretched over the texture 50 in a way so as to confer to the latter the wanted degree of compaction. Layer 58, as held in stretched condition, is locked in position on the rigid shaping member 52. To this effect, and as with the embodiment of FIG. 1, the edges of the layer 58 are wedged between longitudinal flanges 54a, 54b of the shaping member 52 and bars 56a, 56b screwed on said flanges. Layer 58 is gripped by means of longitudinal ribs formed on the bars 56a, 56b and cooperate with grooves 55a, 55b formed in the flanges 54a, 54b.

In order to ensure shaping of texture 50 in its hollow (or concave portions), inserts 59a, 59b are introduced between the layer 58 and the texture 50, inserted layers 51a, 51b being placed between the inserts 59a, 59b and the texture 50. Inserts 59a, 59b are section pieces having, on one side, a surface of convex shape corresponding to the shape of the hollow portions of the texture 50 and, on the other side, a flat or convex portion over which rests the shaping layer.

Figure 6:
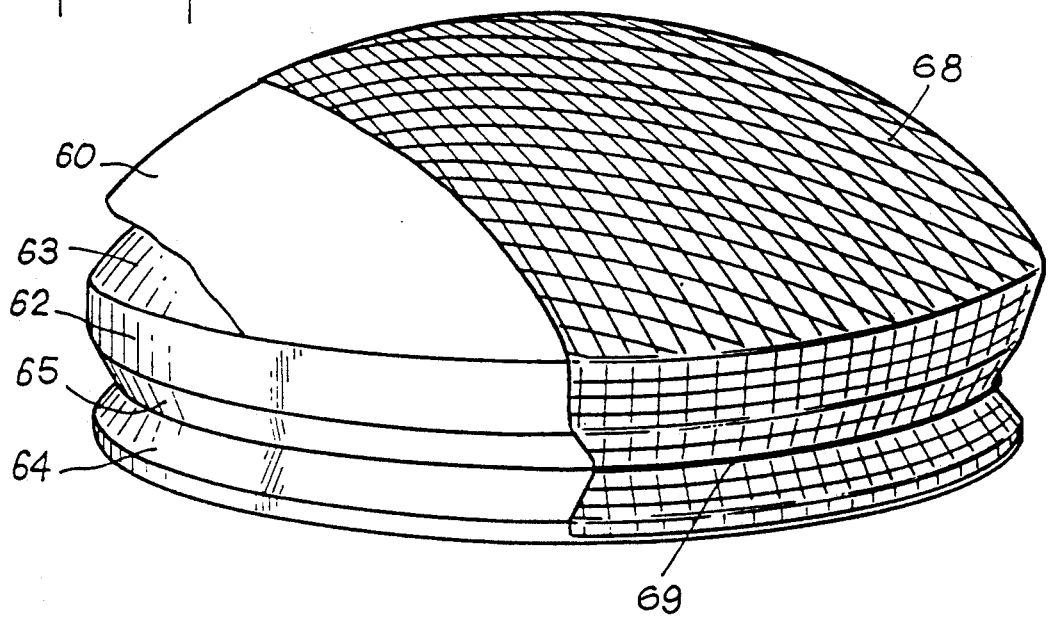
FIGS. 6 and 7 are diagrammatical perspective views illustrating yet another two embodiments of the method according to the invention for producing a composite material part in cap form.

FIG. 6 shows a fibrous texture 60 shaped as a spherical cap gripped between a rigid shaping member 62 and a shaping layer 68.

The shaping member 62 has an upper part 63 whose surface is spherical cap-shaped correspondingly to the shape to be given to the texture 60, and a base 64 with an annular groove 65 formed on its periphery.

The shaping layer 68 is a cloth with deformable meshes, such as for example a flat braid, which is stretched over the texture 60, which latter is formed by stacking layers of cloth.

The tension of the shaping layer 68 is adjusted in relation to the degree of compaction to be given to the texture 60. The layer 68, kept in stretched condition, is locked in position on the shaping member 62 by a tieing wire 69, at the level of the groove 65 at the base of the shaping member.

Figure 7:
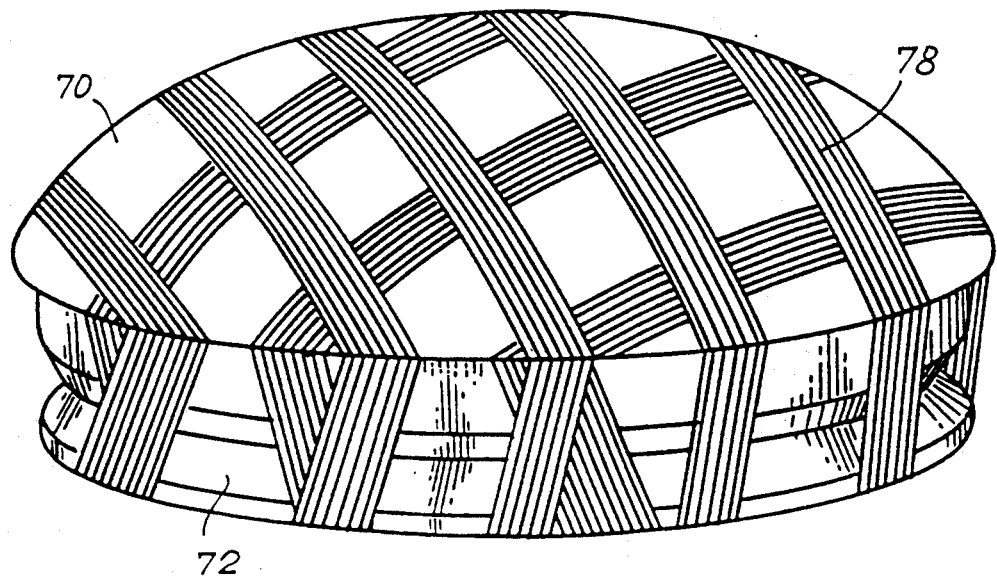

FIG. 7 shows a fibrous texture 70, which is also shaped as a spherical cap, applied on a shaping member 72, the texture 70 and shaping member 72 being respectively similar to the texture 60 and to the shaping member 62 according to the embodiment of FIG. 6.

Application of the texture 70 over the shaping member 72 is achieved by winding a shaping strip 78 around said texture. Said strip is a strip of cloth or a tape, which is wound around the assembly composed of the shaping member 72 and texture 70, the winding being made in several different directions.

In the foregoing description, it is proposed to compact the fibrous texture by exerting a mechanical tension on the shaping strip or layer.

As a variant, the material constituting the shaping strip or layer may be selected to be such as to allow compaction of the fibrous texture by non-mechanical means, such as for example by thermo-retraction.

A suitable thermo-retractile material is a carbon-precursor material such as a polyacrylonitrile (P.A.N.). Such material, heat-treated when in position on the fibrous texture, achieves the compaction of the latter due to the retraction of the P.A.N. at high temperature.

What is claimed is:

1. Process for the fabrication of a composite material part comprising a fibrous reinforcement in a densifying matrix, the process comprising the steps of:
   shaping a fibrous reinforcement into a form;
   densifying the form by chemical vapor infiltration, by diffusing a gaseous flux into the fibrous reinforcement;
   the shaping of the form including applying a deformable band of bidimensional fibrous material to said form and retaining said band in place during at least a portion of the infiltration of the fibrous reinforcement, said band having porosity allowing penetration of the gaseous flux for infiltration of the reinforcement.

2. The process as claimed in claim 1, wherein the band is stretched over the fibrous reinforcement.

3. The process as claimed in claim 2, wherein the tension of the band is adjusted as a function of the degree of compaction wanted for the fibrous reinforcement.

4. The process as claimed in claim 1, wherein the band is made from a material having a thermal expansion coefficient different from that of the fibrous reinforcement.

5. The process as claimed in claim 1, wherein the band is in a cloth of refractory fibers.

6. The process as claimed in claim 1, wherein the band is held in position against the reinforcement by being wound over.

7. The process as claimed in claim 1, wherein shaping of the fibrous reinforcement is partly achieved with a rigid tool to which the shaping band is connected.

8. The process as claimed in claim 7, wherein between the fibrous reinforcement and the rigid tool, there is provided an inserted layer in a refractory material having a thermal expansion coefficient different from that of the reinforcement.

9. The process as claimed in claim 1, wherein shaping of the fibrous reinforcement is at least partly achieved with a strip wound around the reinforcement.

10. The process as claimed in claim 1, wherein shaping of the fibrous reinforcement is at least partly achieved with a band in a thermo-retractable material.

11. The process as claimed in claim 1, wherein at least one insert is introduced between the shaping band and the fibrous reinforcement, at the level of a concave portion of the shape to be given to the fibrous reinforcement.

* * * * *